(12) United States Patent
Lee et al.

(10) Patent No.: US 9,123,916 B2
(45) Date of Patent: Sep. 1, 2015

(54) RECHARGEABLE BATTERY

(75) Inventors: Jae-Wook Lee, Yongin-si (KR);
Young-Kee Shin, Yongin-si (KR);
Yong-Sam Kim, Yongin-si (KR);
Yong-Woo Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 176 days.

(21) Appl. No.: 13/017,351

(22) Filed: Jan. 31, 2011

(65) Prior Publication Data

US 2011/0300423 A1    Dec. 8, 2011

(30) Foreign Application Priority Data

Jun. 3, 2010   (KR) ........................ 10-2010-0052470

(51) Int. Cl.
*H01M 2/02*   (2006.01)

(52) U.S. Cl.
CPC .......... *H01M 2/0202* (2013.01); *H01M 2/0275* (2013.01); *H01M 2/0277* (2013.01); *H01M 2/0285* (2013.01); *H01M 2/0217* (2013.01); *H01M 2/0287* (2013.01)

(58) Field of Classification Search
None
See application file for complete search history.

(56) References Cited

U.S. PATENT DOCUMENTS

| | | | |
|---|---|---|---|
| 6,886,311 B2 | 5/2005 | Toth et al. | |
| 7,318,523 B2 | 1/2008 | Spatafora | |
| 2005/0042507 A1 | 2/2005 | Kim | |
| 2006/0099490 A1* | 5/2006 | Cho et al. | 429/53 |

FOREIGN PATENT DOCUMENTS

| | | |
|---|---|---|
| JP | 11-267779 | 10/1999 |
| JP | 2002-198011 | 7/2002 |
| KR | 10-2006-0018412 | 3/2006 |
| KR | 1020060034508 | 4/2006 |
| KR | 10-2006-0112393 | 11/2006 |
| KR | 10-2007-0005156 | 1/2007 |
| KR | 10-2007-0038113 | 4/2007 |
| KR | 10-2008-0012872 | 2/2008 |
| KR | 10-2008-0036746 | 4/2008 |
| KR | 10-2009-0031158 | 3/2009 |
| KR | 10-2009-0110478 | 10/2009 |

OTHER PUBLICATIONS

Korean Notice of Allowance issued on Mar. 21, 2012 in connection with Korean Patent Application Serial No. 10-2010-0052470 and Request for Entry of the Accompanying Office Action attached herewith.

* cited by examiner

*Primary Examiner* — Cynthia K Walls
(74) *Attorney, Agent, or Firm* — Robert E. Bushnell, Esq.

(57) ABSTRACT

A rechargeable battery prevents an electrolyte solution from being leaked from a can connector and improves the productivity of a can. A rechargeable battery constructed as an embodiment of the present invention includes an electrode assembly formed by stacking and winding a positive electrode, a separator, and a negative electrode; a can receiving the electrode assembly, and the can including a body formed by a polygonal tube and a bottom plate bent from at least one surface among multiple surfaces at an opening of the body and physically connected to the rest of the multiple surfaces of the body; and a cap assembly sealing another opening of the body and the cap assembly being disposed opposite to the bottom plate.

20 Claims, 20 Drawing Sheets

RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on 3 Jun. 2010 and there duly assigned Serial No. 10-2010-0052470.

BACKGROUND OF THE INVENTION

1. Field of the Invention

The present invention relates to a rechargeable battery, and more specifically, to a rechargeable battery that prevents an electrolyte solution from being leaked from a can connector and improves the productivity of a can.

2. Description of the Related Art

Unlike primary batteries, rechargeable batteries may be repetitively charged and discharged. Representative rechargeable batteries include nickel-hydrogen batteries, lithium batteries, and lithium ion batteries, and the rechargeable batteries may be manufactured in a package form and may be widely used in portable electronic apparatuses such as cellular phones, notebook computers, and camcorders.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery that prevents an electrolyte solution from being leaked from a can connector and improves the productivity of a can.

An embodiment of the present invention provides a rechargeable battery that includes an electrode assembly formed by stacking and winding a positive electrode, a separator, and a negative electrode; a can receiving the electrode assembly, and the can including a body formed by a polygonal tube and a bottom plate bent from at least one surface of the body among multiple surfaces of the body towards an opening of the body and the bottom plate being physically connected to the rest of the multiple surfaces of the body; and a cap assembly sealing another opening of the body and the cap assembly being disposed spaced apart and opposite to the bottom plate.

The portion of the body may include a pair of first longer side and second longer side facing each other, and a pair of first shorter side and second shorter side facing each other while connecting the first longer side and the second longer side to each other.

The bottom plate may have a quadrangle shape to be connected to the first shorter side through a bent portion, and to be connected to the second shorter side and the first longer side and the second longer side through a welded portion.

The bottom plate may have the quadrangle shape to be connected to the first longer side through the bent portion, and to be connected to the second longer side and the first shorter side and the second shorter side through the welded portion.

The bottom plate may include a first bottom plate having the quadrangle shape to be connected to the first shorter side through the bent portion, and a second bottom plate having the quadrangle shape to be connected to the second shorter side through the bent portion, and the first bottom plate and the second bottom plate may face each other to be connected to each other through the welded portion, and to be connected to the first longer side and the second longer side through the welded portion.

The welded portion through which the first bottom plate and the second bottom plate face each other to be connected with each other may be positioned at the centers of the first longer side and the second longer side.

The bottom plate may include a first bottom plate having the quadrangle shape to be connected to the first longer side through the bent portion, and a second bottom plate having the quadrangle shape to be connected to the second longer side through the bent portion, and the first bottom plate and the second bottom plate may face each other to be connected to each other through the welded portion, and to be connected to the first shorter side and the second shorter side through the welded portion.

The welded portion through which the first bottom plate and the second bottom plate face each other to be connected with each other may be positioned at the centers of the first shorter side and the second shorter side.

The bottom plate may include a first bottom plate having a trapezoid shape to be connected to the first longer side through the bent portion, a second bottom plate having the trapezoid shape to be connected to the second longer side through the bent portion, a third bottom plate having a triangle shape to be connected to the first shorter side through the bent portion, and a fourth bottom plate having the triangle shape to be connected to the second shorter side through the bent portion, the first bottom plate and the second bottom plate may face each other to be connected with each other through the welded portion, and the third bottom plate and the fourth bottom plate may be connected to the first bottom plate and the second bottom plate through the welded portion.

The bottom plate may include a first bottom plate having the quadrangle shape to be connected to the first longer side through the bent portion, and a second bottom plate having the quadrangle shape to be connected to the second longer side through the bent portion, and the first bottom plate and the second bottom plate face each other to be connected to each other through a molded portion, and the first bottom plate and the second bottom plate are connected to the first shorter side and the second shorter side through the molded portion.

The bottom plate may include a first bottom plate having the quadrangle shape to be connected to the first longer side through the bent portion, and a second bottom plate having the quadrangle shape to be connected to the second longer side through the bent portion, and the first bottom plate and the second bottom plate may face each other to be connected with each other through the welded portion, and to be connected to the first shorter side and the second shorter side through the welded portion, and the welded portion may be covered with the molded portion.

The bottom plate may be connected to each side of the rest surfaces through a heterogeneous material.

In accordance with the embodiment of the present invention, a part of a bottom plate may be bent from at least one surface of a body among multiple surfaces of the body towards one opening of a body and the other part of the bottom plate is connected to the rest surfaces among the multiple surfaces in order to form a can; therefore, an electrolyte solution may be prevented from being leaked from a connection portion between the body and the bottom plate and may improve the productivity of the can by decreasing the length of the connection portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
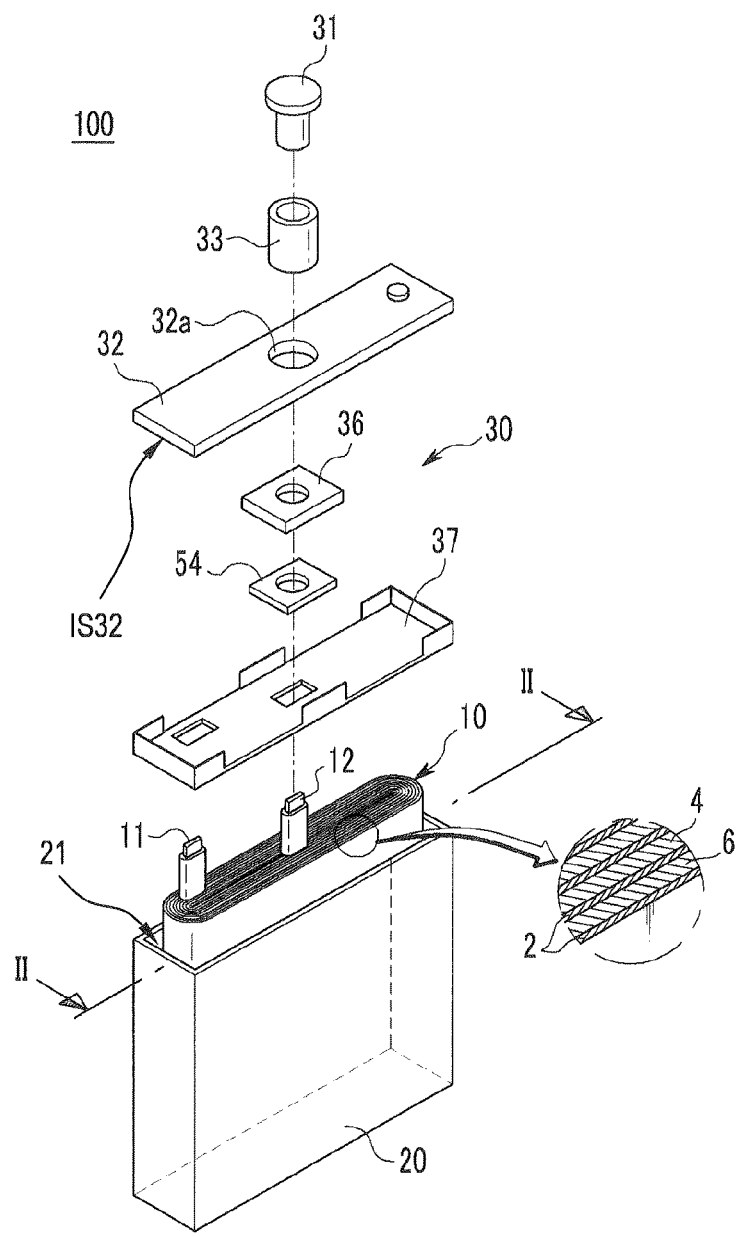
FIG. 1 is an exploded oblique view of a rechargeable battery constructed as an embodiment of the present invention.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

The rechargeable battery may include an electrode assembly in which a positive electrode and a negative electrode are stacked and spirally wound in the form of a jelly roll with a separator interposed therebetween, a can receiving the electrode assembly therein together with the electrolyte solution, and a cap assembly sealing a top opening of the can.

As an example, the can may be made of aluminum or an aluminum alloy and the can may have a cylindrical shape or an angular shape. An angular can may be formed by cutting a pipe extrusion-molded and by welding an additionally separately manufactured bottom plate to one opening of the cut unit pipe as consecutive processes.

In this case, since a welded portion is formed between the bottom plate of and the unit pipe of the can, the welded portion may elongate in order to have the same length of an outer peripheral length of the bottom plate. As a result, the possibility that the electrolyte solution will be leaked from the welded portion may be disadvantageously increased and the productivity of the can may be disadvantageously decreased.

Figure 2:
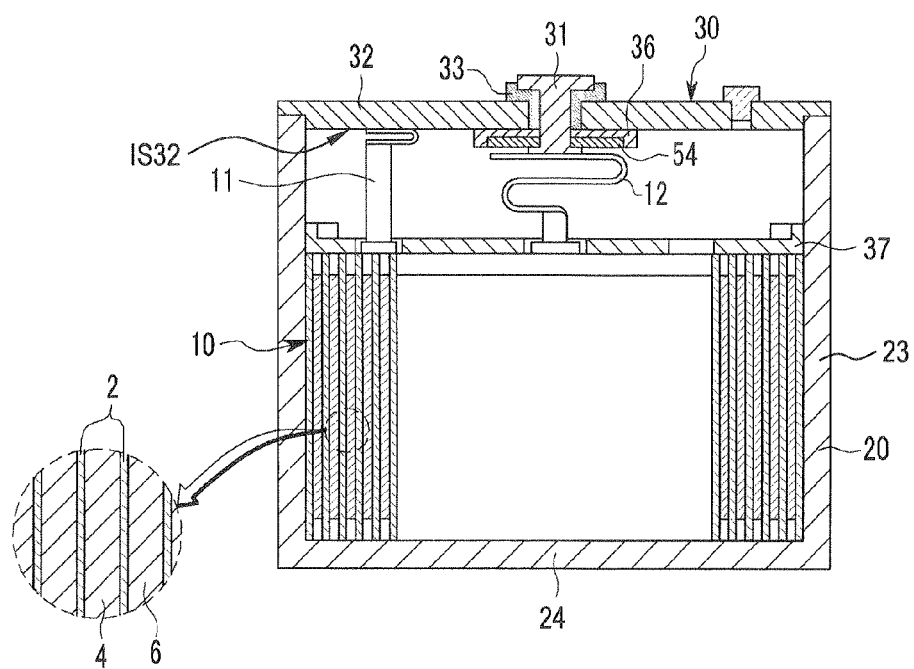
FIG. 2 is a cross-sectional view taken along line II-II of FIG. 1 while a rechargeable battery is assembled.

FIG. 1 is an exploded perspective view of a rechargeable battery constructed as an embodiment of the present invention and FIG. 2 is a cross-sectional view taken along line II-II of FIG. 1 while a rechargeable battery is assembled. Referring to FIGS. 1 and 2, the rechargeable battery 100 according to the first embodiment includes an electrode assembly 10, a can 20 receiving the electrode assembly 10 therein together with an electrolyte solution, and a cap assembly 30 sealing an opening 21 formed at one portion of the can 20.

A positive electrode 4 and a negative electrode 6 are stacked with a separator 2 interposed therebetween and wound in the form of a jelly roll to form the electrode assembly 10. The electrode assembly 10 has a shape corresponding to an inner space of the angular can 20 to be inserted into the interior of the can 20.

The can 20 receives the electrode assembly 10 through the opening 21 formed at one portion, and the can 20 may be formed by an electrical conductor and serve as an electrode terminal. For example, the can 20 may be made of aluminum or an aluminum alloy, and the can 20 may be electrically connected to the positive electrode 4 of the electrode assembly 10 and serve as a positive terminal. In this case, an electrode terminal 31 provided in the cap assembly 30 is electrically connected to a negative electrode 6 of the electrode assembly 10 to serve as a negative terminal. On the contrary, the can 20 may serve as the negative terminal and the electrode terminal 31 may serve as the positive terminal.

The cap assembly 30 includes a cap plate 32 fixed to the opening 21 of the can 20, the electrode terminal 31 inserted into a terminal hole 32a of a cap plate 32 with an insulating gasket 33 interposed therebetween, a terminal plate 54 electrically connected to the lower end of the electrode terminal 31, an insulating plate 36 positioned between the cap plate 32 and the terminal plate 54, and an insulating case 37 electrically insulating the electrode assembly 10 and the cap assembly 30 from each other. The insulating gasket 33 electrically insulates the electrode terminal 31 and the cap plate 32 from each other, and the insulating plate 36 electrically insulates the terminal plate 54 and the cap plate 32 from each other.

A positive lead 11 fixed to the positive electrode 4 of the electrode assembly 10 is welded to an inner surface IS32 of the cap plate 32 in order to transfer electrical current in the positive electrode 4 to the cap plate 32 and the can 20. That is, the can 20 may serve as the positive terminal.

A negative lead 12 fixed to the negative electrode 6 of the electrode assembly 10 is welded to the bottom of the terminal plate 54 in order to transfer electrical current in the negative electrode 6 to the terminal plate 54 and the electrode terminal 31. That is, the electrode terminal 31 may serve as the negative terminal.

Figure 3:
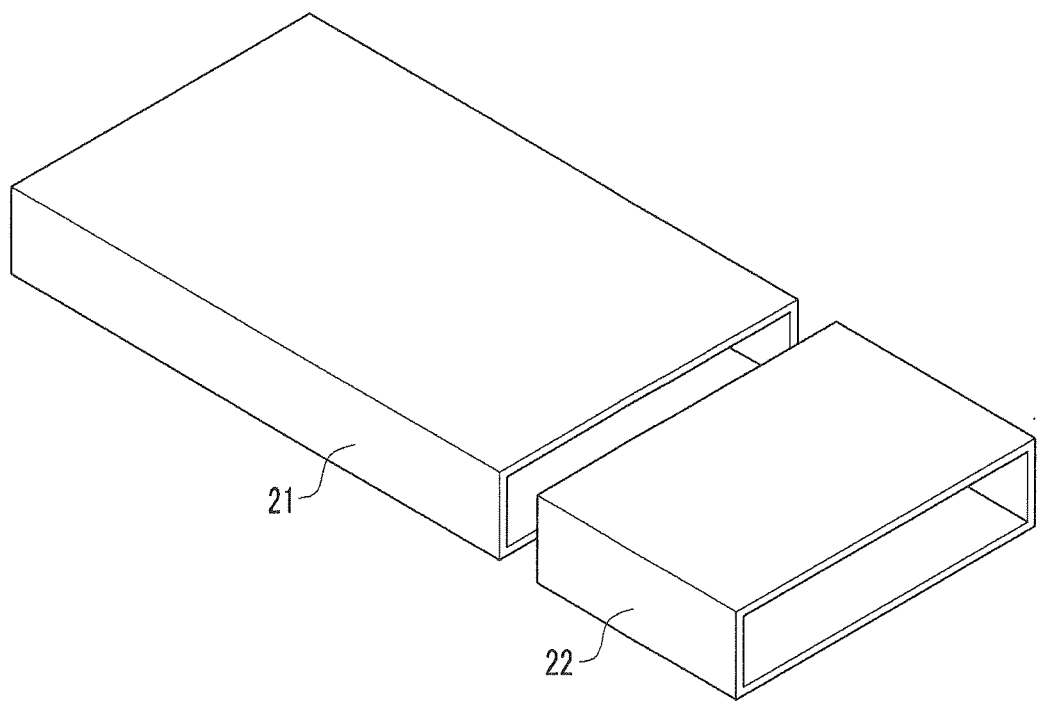
FIG. 3 is an oblique view of a state in which a molded pipe is cut into unit pipes during a can production process applied to a rechargeable battery of FIG. 1.

FIG. 3 is an oblique view of a state in which a molded pipe is cut into unit pipes during a can production process, i.e., a process manufacturing a can, applied to a rechargeable battery of FIG. 1. Referring to FIG. 3, the process of manufacturing the can 20 used in the rechargeable battery 100 includes steps of molding a pipe 21 and cutting the pipe 21 into unit pipes 22. The pipe 21 may be molded by extruding or drawing. A unit pipe may be cut in order to have a shape suitable for forming a can including a body and a bottom plate.

Figure 4:
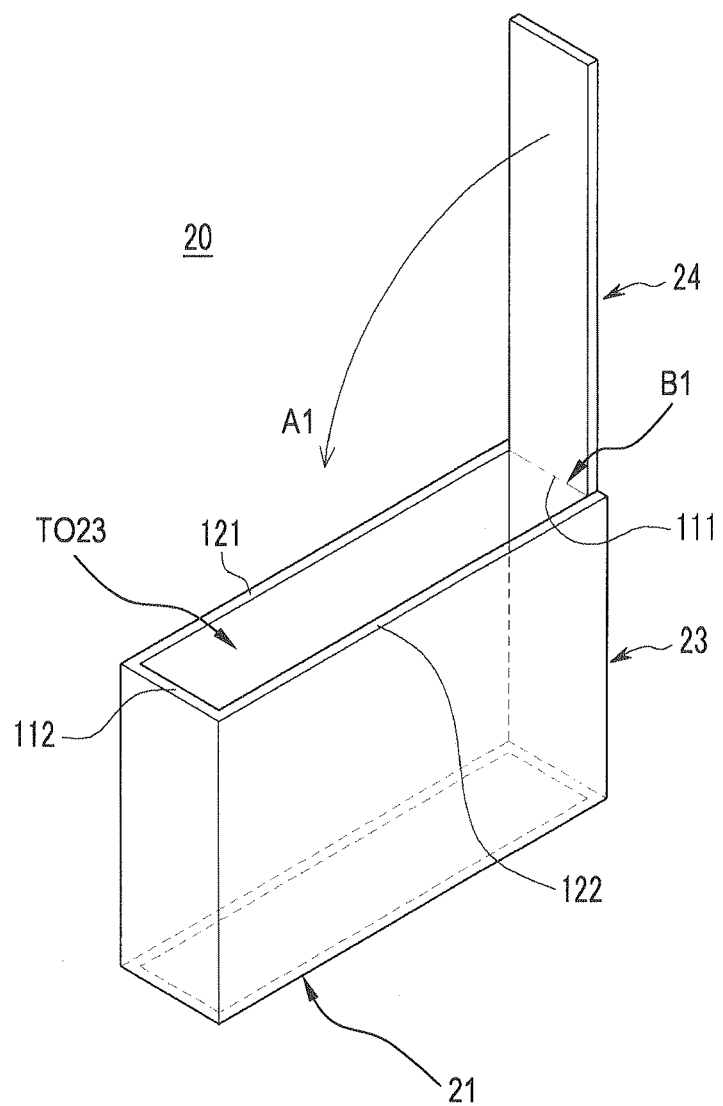
FIG. 4 is an exploded oblique view of a can constructed as a first embodiment in which a body and a bottom plate are formed integrally with each other by cutting unit pipes of FIG. 3.

FIG. 4 is an exploded oblique view of a can 20 constructed as a first embodiment in which a body 23 and a bottom plate 24 are formed integrally and simultaneously as a single body and are connected with each other by cutting a unit pipe 22 of FIG. 3. In this embodiment, a unit pipe 22 may be cut to have a body 23 and a bottom plate 24, with the bottom plate 24 being connected to the first short side 111 of the body 23. Referring to FIG. 4, the process of manufacturing the can 20 includes cutting the unit pipe 22 into a body 23 and a bottom plate 24. A part of the body 23 and a part of the bottom plate 24 formed through the cutting process are connected to each other at the first short side 111 and the rest parts are separated from each other.

The body 23 is formed by a polygonal pipe having multiple surfaces, and for example, is formed by a quadrangular pipe. The opening at one portion of the body 23 includes a pair of first and second short sides 111 and 112 and a pair of first and second long sides 121 and 122 facing each other while connecting the first and second short sides 111 and 112. In the cutting process, the bottom plate 24 has a quadrangle shape and is connected to the first short side 111 of the body 23 (see FIG. 4). The polygonal pipe is integratively and simultaneously formed as a single body.

Figure 5:
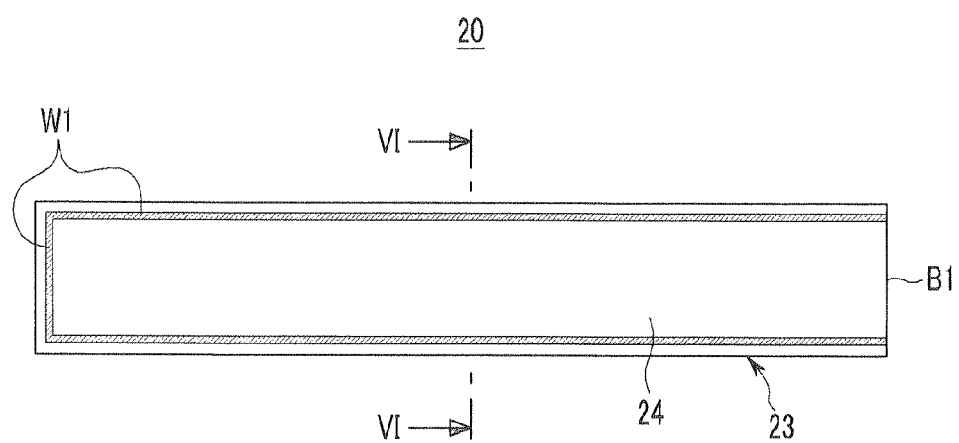
FIG. 5 is a plan view of a can of which a body and a bottom plate of FIG. 4 are welded to each other.
Figure 6:
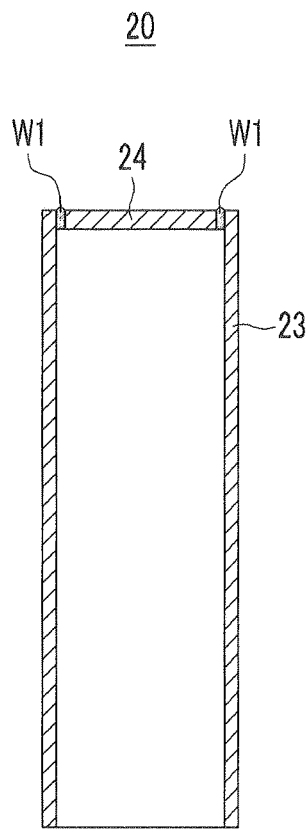
FIG. 6 is a cross-sectional view taken along line VI-VI of FIG. 5.

FIG. 5 is a plan view of a can of which a body and a bottom plate of FIG. 4 are welded to each other and FIG. 6 is a cross-sectional view taken along line VI-VI of FIG. 5. Referring to FIGS. 5 and 6, the body 23 and the bottom plate 24 passing through the cutting process pass through a bending process and a welding process. The bending process bends the bottom plate 24 on a first surface of the body 23, that is, bends the bottom plate 24 from the first short side 111 towards the opening 1023 of the body 23 in order to allow the bottom plate 24 to face the second short side 112 and the first and second long sides 121 and 122. The opening TO23 is disposed opposite to the opening 21. The welding process connects the bottom plate 24 to the second short side 112 and the first and second long sides 121 and 122 through a welded portion W1 while the bottom plate 24 is connected to the first side 111 through a bent portion B1. In this embodiment, the bottom plate 24 is bent at the bent portion B1 in direction A1 towards the opening 1023 the body 23, and thus the bottom plate 24 may be physically connected to the short side 112 and to the long sides 121, 122 of the body 23 via the welded portion W1.

In a known can, all rectangular sides of the body and the bottom plate are connected to each other by a heterogeneous material, and the body and the bottom plate are separately manufactured. Contrary to this, in the can 20 of the first embodiment, the bent portion B1 connecting the bottom plate 24 and the first short side 111 with each other advantageously shortens an overall length of the welded portion W1 by forming the welded portion W1 connecting the bottom plate 24 to the body 23 through a heterogeneous material on three sides. In the first embodiment, the first short side 111 of the body 23 is continuously formed with at least one side of the bottom plate 24 without interruption, and in this case, no discontinuity occurs between the first short side 111 of the body 23 and this one side of the bottom plate 24. Accordingly, the shortening of the length of the welded portion W1 in the can 20 may reduce a leakage possibility of the electrolyte solution and improve welding productivity of the body 23 and the bottom plate 24.

The can 20 manufactured by passing through the cutting, bending, and welding processes from the unit pipe 22 receives the electrode assembly 10 in the rechargeable battery 100. In this case, the body 23 receives the electrode assembly 10 and the bottom plate 24 supports the electrode assembly 10 by sealing the opening at one portion of the body 23.

Figure 7:
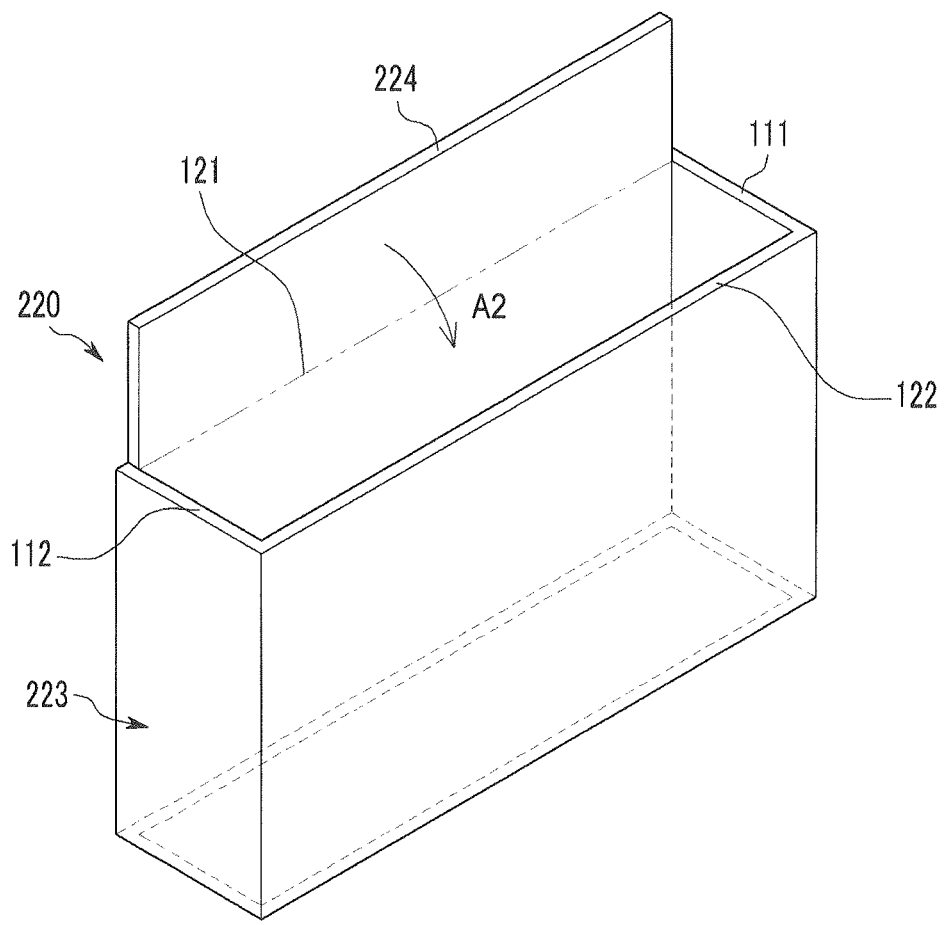
FIG. 7 is an exploded oblique view of a can constructed as a second embodiment of the present invention.

FIG. 7 is an exploded oblique view of a can 220 constructed as a second embodiment of the present invention. Referring to FIG. 7, one portion of a body 223 constructed as the second embodiment includes a pair of first and second short sides 111 and 112 facing each other and a pair of first and second long sides 121 and 122 facing each other while connecting the first and second short sides 111 and 112. In the cutting process, the bottom plate 224 has a quadrangle shape and is connected to the first long side 121 of the body 223. In the second embodiment, the first long side 121 of the body 223 is continuously formed with at least one side of the bottom plate 224 without interruption, and in this case, no discontinuity occurs between the first long side 121 of the body 223 and this one side of the bottom plate 224.

Figure 8:
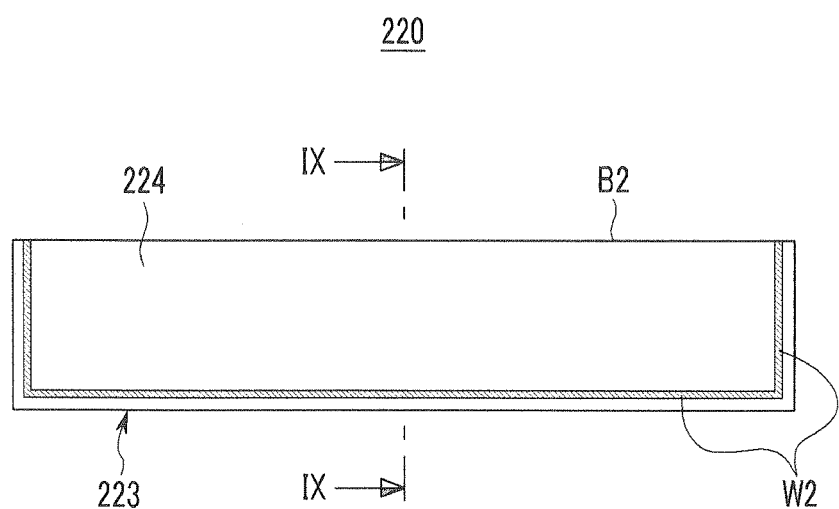
FIG. 8 is a plan view of a can of which a body and a bottom plate of FIG. 7 are welded to each other.
Figure 9:
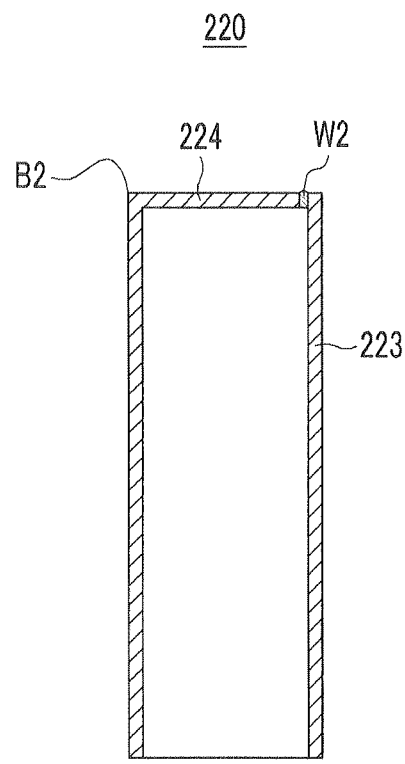
FIG. 9 is a perspective view taken along line IX-IX of FIG. 8.

FIG. 8 is a plan view of a can of which a body and a bottom plate of FIG. 7 are welded to each other and FIG. 9 is a cross-sectional view taken along line IX-IX of FIG. 8. Referring to FIGS. 8 and 9, the body 223 and the bottom plate 224 passing through the cutting process pass through a bending process and a welding process. The bending process bends the bottom plate 224 on a first surface of the body 223, that is, bends the bottom plate 224 from the second long side 122 in direction A2 to allow the bottom plate 224 to face the first and second short sides 111 and 112. The welding process connects the bottom plate 224 to the second long side 122 and the first and second short sides 111 and 112 through a welded portion W2.

In the can 20 of the first embodiment, the bottom plate 24 is bent from and the first short side 111 at the bent portion B1, and the welded portion W1 connects the second short side 112 and the first and second long sides 121 and 122 to the bottom plate 24. Different from the first embodiment, in the can 220 of the second embodiment, the bottom plate 224 is bent from the first long side 121 at the bent portion B2, and the welded portion W2 connects the bottom plate 224 to the first and second short sides 111 and 112, and the second short side 112. Therefore, the length of the welded portion W2 in the can 220 of the second embodiment is smaller than that of the welded portion W1 in the can 20 of the first embodiment, because the first long side 121 has a longer length compared to the first short side 111. Therefore, the shortened length of the welded portion W2 may further reduce a leakage possibility of the electrolyte solution and further improve the welding productivity of the body 223 and the bottom plate 224.

Figure 10:
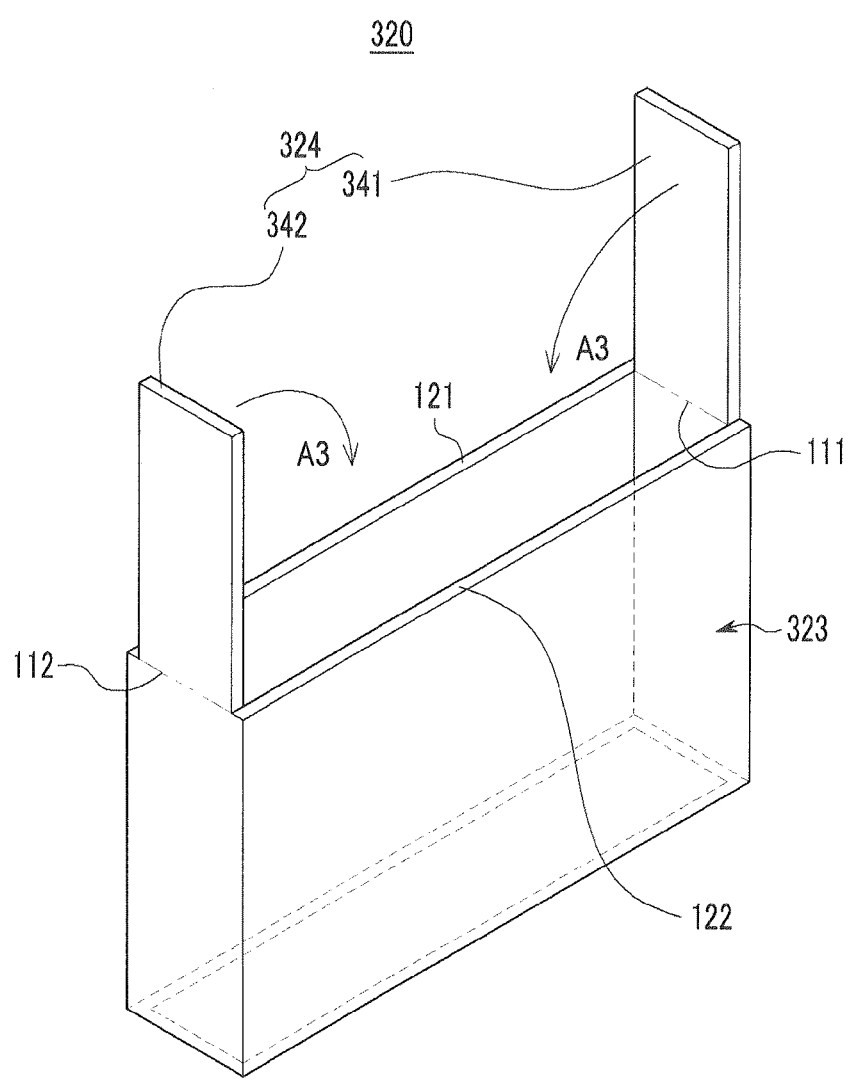
FIG. 10 is an exploded oblique view of a can constructed as a third embodiment of the present invention.

FIG. 10 is an exploded oblique view of a can 320 construed as a third embodiment of the present invention. Referring to FIG. 10, one portion of a body 323 construed as the third embodiment includes a pair of first and second short sides 111 and 112 facing each other and a pair of first and second long sides 121 and 122 facing each other while connecting the first and second short sides 111 and 112. In the cutting process, a bottom plate 324 is formed to have first and second bottom plates 341 and 342 each having a quadrangle shape, and the first and second bottom plates 341 and 342 are respectively connected to the first and second short sides 111 and 112 of the body 323.

Figure 11:
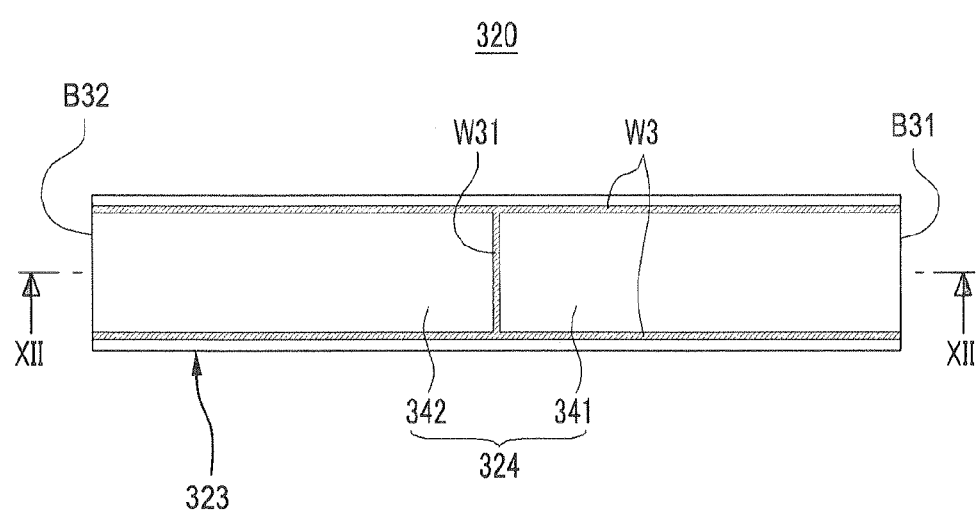
FIG. 11 is a plan view of a can of which a body and a bottom plate of FIG. 10 are welded to each other.
Figure 12:
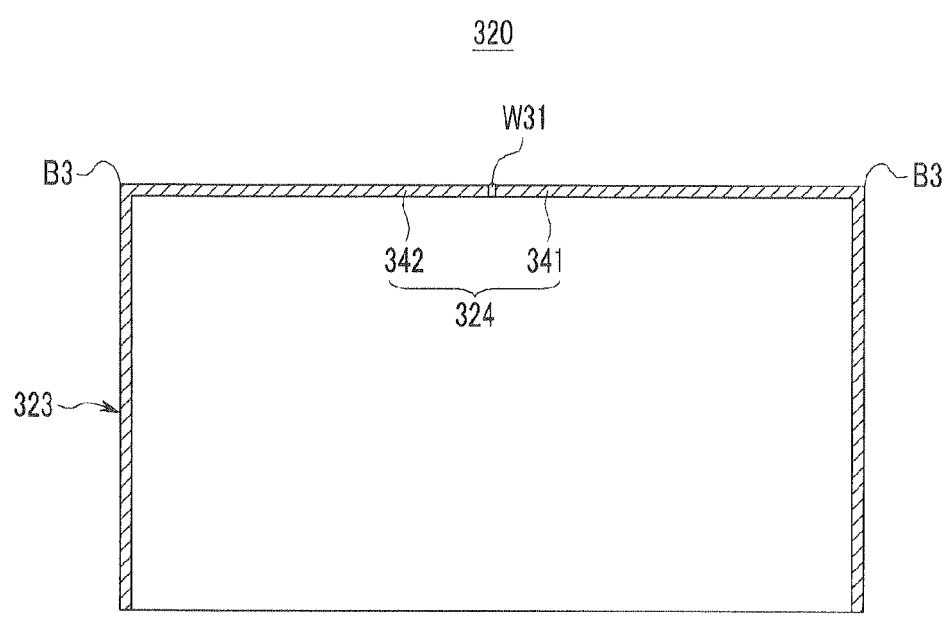
FIG. 12 is a cross-sectional view taken along line XII-XII of FIG. 10.

FIG. 11 is a plan view of a can 320 of which a body 323 and a bottom plate 324 of FIG. 10 are welded to each other and FIG. 12 is a cross-sectional view taken along line XII-XII of FIG. 10. Referring to FIGS. 11 and 12, the body 323 and the bottom plate 324 passing through the cutting process pass through a bending process and a welding process. The bending process bends the first and second bottom plates 341 and 342 on a second surface of the body 323 in direction A3, that is, bends the first and second bottom plates 341 and 342 from the first and second short sides 111 and 112 to allow the first and second bottom plates 341 and 342 to face the first and second long sides 121 and 122.

The welding process connects the first and second bottom plates 341 and 342 to the first and second long sides 121 and 122 through a welded portion W3, and connects the first and second bottom plates 341 and 342 facing each other through a welded portion W31 while connecting the first and second bottom plates 341 and 342 to the first and second short sides 111 and 112 through a bent portion B3. The welded portion W31 for connecting the first and second bottom plates 341 and 342 facing each other is positioned at the center of the first and second long sides 121 and 122 to maintain the balance of force acting on the bottom plate 324.

The can 20 of the first embodiment integratively forms the bottom plates 24 to connect the bottom plate 24 to the first short side 111 through the bent portion B1 and to connect the bottom plate 24 to the second short side 112 through the welded portion W1. Different from the first embodiment, the can 320 of the third embodiment divides the bottom plates 34 into the first and second bottom plates 341 and 342, the bent portion B31 connects the first bottom plate 341 to the first short side 111 and the bent portion B32 connects the second bottom plate 342 to the second short side 112, and the welded portion W31 connects the first and second bottom plates 341 and 342. Therefore, the can 320 of the third embodiment has the welded portions W3 and W31 having the same length as the welded portion W1 of the can 20 of the first embodiment, and the can 32 is formed in a symmetric structure in the length directions of the first and second long sides 121 and 122 around the welded portion W31 on the bottom plate 324 so as to achieve more stable durability. In the third embodiment, the first short side 111 of the body 323 is continuously limited with at least one side of the first bottom plate 341 without interruption and the second short side 112 of the body 323 is continuously formed with at least one side of the second bottom plate 342 without interruption, and in this case, no discontinuity occurs between the first short side 111 of the body 323 and this one side of the first bottom plate 341 and no discontinuity occurs between the second short side 112 of the body 323 and the second bottom plate 342.

Figure 13:
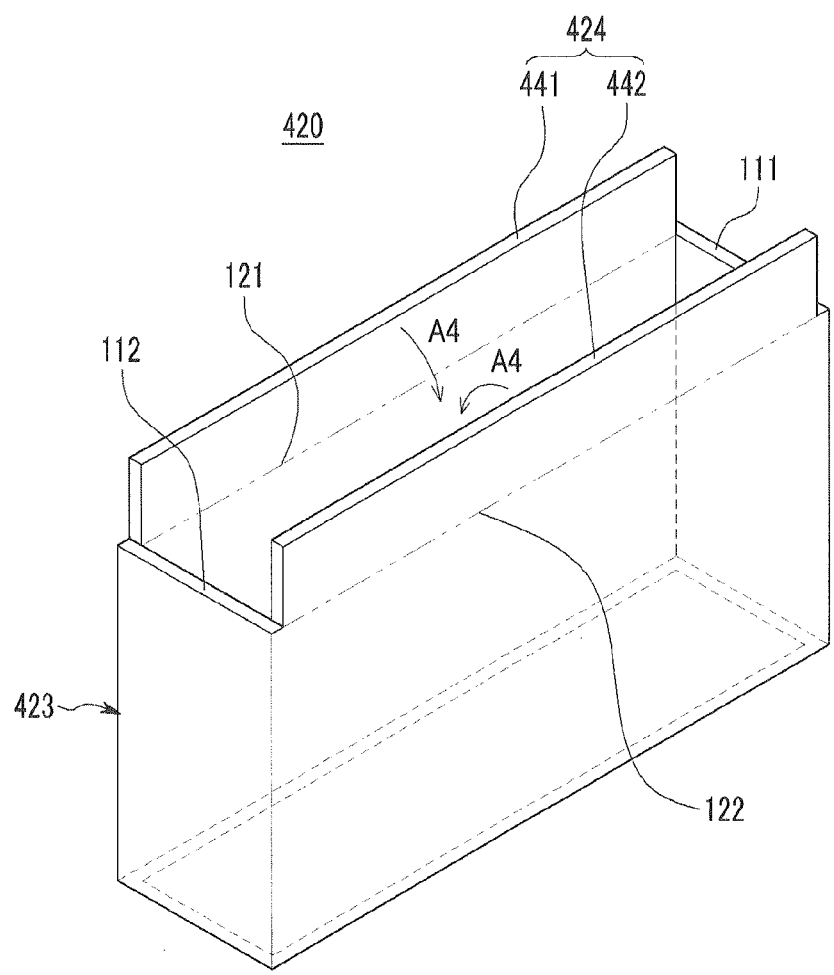
FIG. 13 is an exploded oblique view of a can constructed as a fourth embodiment of the present invention.

FIG. 13 is an exploded oblique view of a can 420 constructed as a fourth embodiment of the present invention. Referring to FIG. 13, one portion of a body 423 constructed as the fourth embodiment includes a pair of first and second short sides 111 and 112 facing each other and a pair of first and second long sides 121 and 122 facing each other while connecting the first and second short sides 111 and 112. In the cutting process, a bottom plate 424 is formed by first and second bottom plates 441 and 442 each having a quadrangle shape and the first and second bottom plates 441 and 442 are connected to the first and second long sides 121 and 122 of the body 423.

Figure 14:
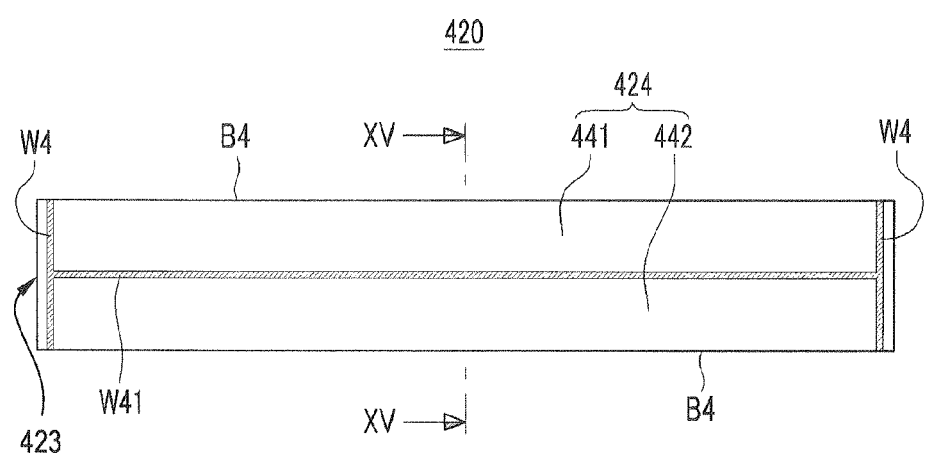
FIG. 14 is a plan view of a can of which a body and a bottom plate of FIG. 13 are welded to each other.
Figure 15:
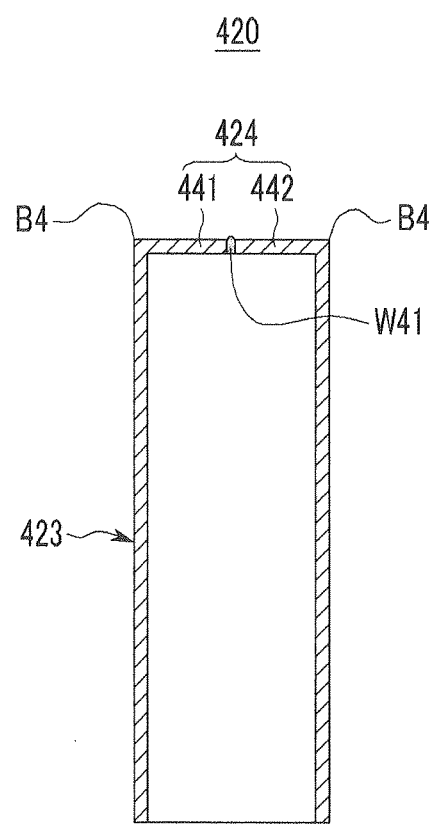
FIG. 15 is a cross-sectional view taken along line XV-XV of FIG. 14.

FIG. 14 is a plan view of a can of which a body and a bottom plate of FIG. 13 are welded to each other and FIG. 15 is a cross-sectional view taken along line XV-XV of FIG. 14. Referring to FIGS. 14 and 15, the body 423 and the bottom plate 424 passing through the cutting process pass through a bending process and a welding process. The bending process bends the first and second bottom plates 441 and 442 on a second surface of the body 423, that is, bends the first and second bottom plates 441 and 442 from the first and second long sides 121 and 122 in direction A4 in order to allow the first and second bottom plates 441 and 442 to face the first and second short sides 111 and 112.

The welding process connects the first and second bottom plates 441 and 442 to the first and second short sides 111 and 112 through a welded portion W4 and further connects the first and second bottom plates 441 and 442 facing each other through a welded portion W41 while connecting the first and second bottom plates 441 and 442 to the first and second long sides 121 and 122 through a bent portion B4. The welded portion W41 for connecting the first and second bottom plates 441 and 442 facing each other is positioned at the center of the first and second short sides 111 and 112 to maintain the balance of force acting on the bottom plate 424. In the fourth embodiment, the first long side 121 of the body 423 is continuously formed with at least one side of the first bottom plate 441 without interruption and the second long side 122 of the body 423 is continuously formed with at least one side of the second bottom plate 442 without interruption, and in this case, no discontinuity occurs between the first long side 121 of the body 423 and this one side of the first bottom plate 441 and no discontinuity occurs between the second long side 122 of the body 423 and this one side of the second bottom plate 442.

Figure 16:
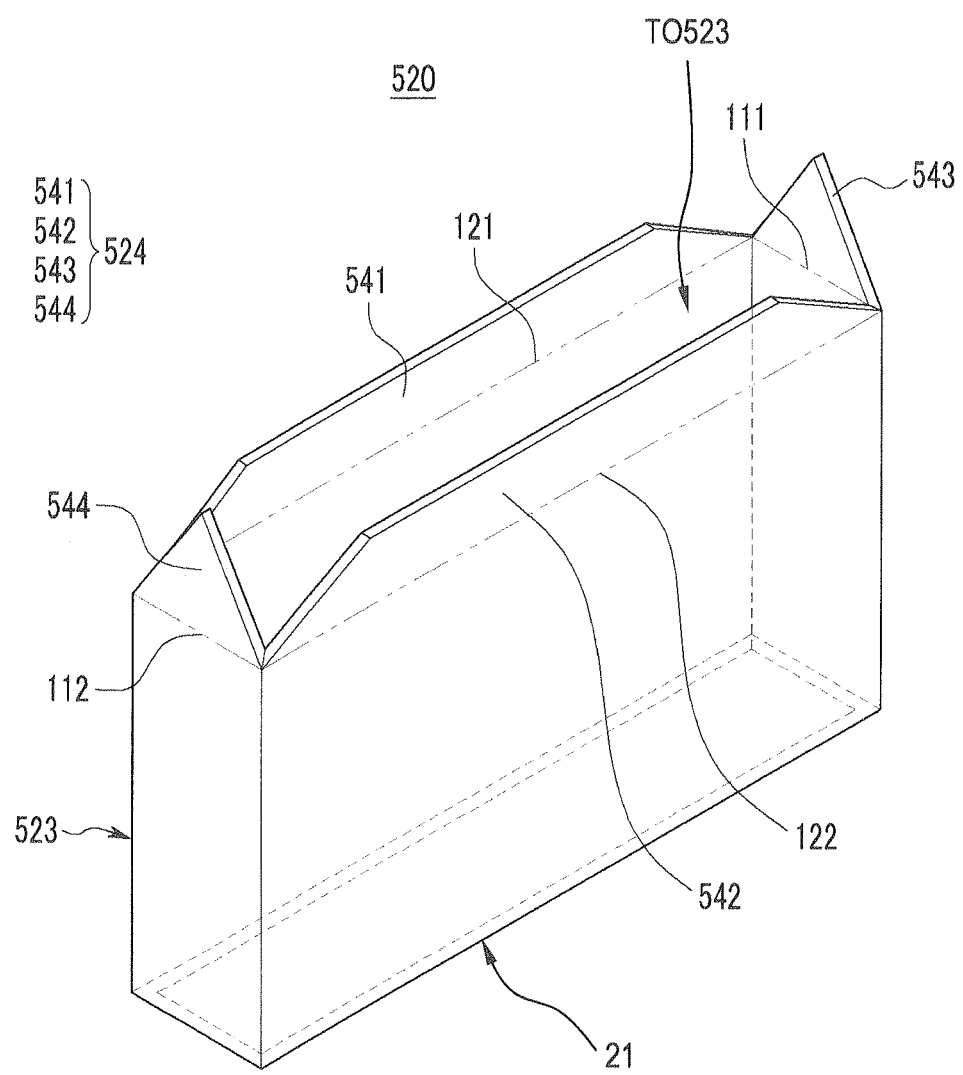
FIG. 16 is an exploded oblique view of a can constructed as a fifth embodiment of the present invention.

FIG. 16 is an exploded oblique view of a can constructed as a fifth embodiment of the present invention. Referring to FIG. 16, one portion of a body 523 in a can 520 constructed as the fifth embodiment includes a pair of first and second short sides 111 and 112 facing each other and a pair of first and second long sides 121 and 122 facing each other while connecting the first and second short sides 111 and 112. In the cutting process, a bottom plate 524 is formed by first and second bottom plates 541 and 542 having a trapezoid shape and third and fourth bottom plates 543 and 544 having a triangular shape. In the bottom plate 524, the first and second bottom plates 541 and 542 are connected to the first and second long sides 121 and 122 of the body 523, respectively and the third and fourth bottom plates 543 and 544 are connected to the first and second short sides 221 and 222, respectively.

Figure 17:
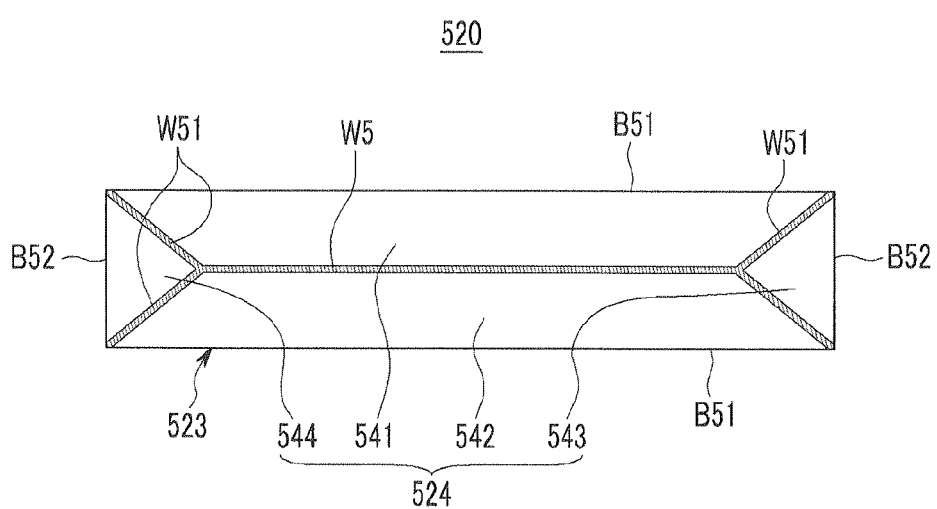
FIG. 17 is a plan view of a can of which a body and a bottom plate of FIG. 16 are welded to each other.

FIG. 17 is a plan view of a can of which a body and a bottom plate of FIG. 16 are welded to each other. Referring to FIG. 17, in the can 620 of a seventh embodiment, the body 523 and the bottom plate 524 passing through the cutting process pass through a bending process and a welding process. The bending process bends the first and second bottom plates 541 and 542 on a second surface of the body 523, that is, bends the first and second bottom plates 541 and 542 from the first and second long sides 121 and 122 toward opening TO523 of the body 523 and bends the third and fourth bottom plates 543 and 544 on the second surface of the body 523 toward opening TO523 of the body 523, that is, bends the third and fourth bottom plates 543 and 544 from the first and second short sides 111 and 112 so as to allow the corresponding bent sides to face each other. The opening TO523 is disposed opposite to the opening 21.

The welding process connects the portions facing each other to each other through a welded portion W5 while connecting the first and second bottom plates 541 and 542 to the first and second long sides 121 and 122 through a bent portion B51 and connects the third and fourth bottom plates 543 and 544 to the first and second bottom plates 541 and 542 facing each other through a welded portion W51 while connecting the third and fourth bottom plates 543 and 544 to the first and second short sides 111 and 112 through a bent portion B52. The welded portion W5 for connecting the first and second bottom plates 541 and 542 facing each other is positioned at the center of the first and second short sides 111 and 112 and the welded portion W51 is positioned at both sides of the first and second long sides 121 and 122 to maintain the balance of force acting on the bottom plate 524. In the fifth embodiment, the first long side 121 of the body 523 is continuously formed with at least one side of the first bottom plate 541 without interruption and the second long side 122 of the body 523 is continuously formed with at least one side of the second bottom plate 542 without interruption, and in this case, no discontinuity occurs between the first long side 121 of the body 523 and this one side of the first bottom plate 541 and no discontinuity occurs between the second long side 122 of the body 523 and the second bottom plate 542. In this embodiment, the first short side 111 of the body 523 is continuously formed with at least one side of the third bottom plate 543 without interruption and the second short side 112 of the body 523 is continuously formed with at least one side of the fourth bottom plate 544 without interruption, and in this case, no discontinuity occurs between the first short side 111 of the body 523 and this one side of the first third plate 543 and no discontinuity occurs between the second short side 112 of the body 523 and the fourth bottom plate 544.

Figure 18:
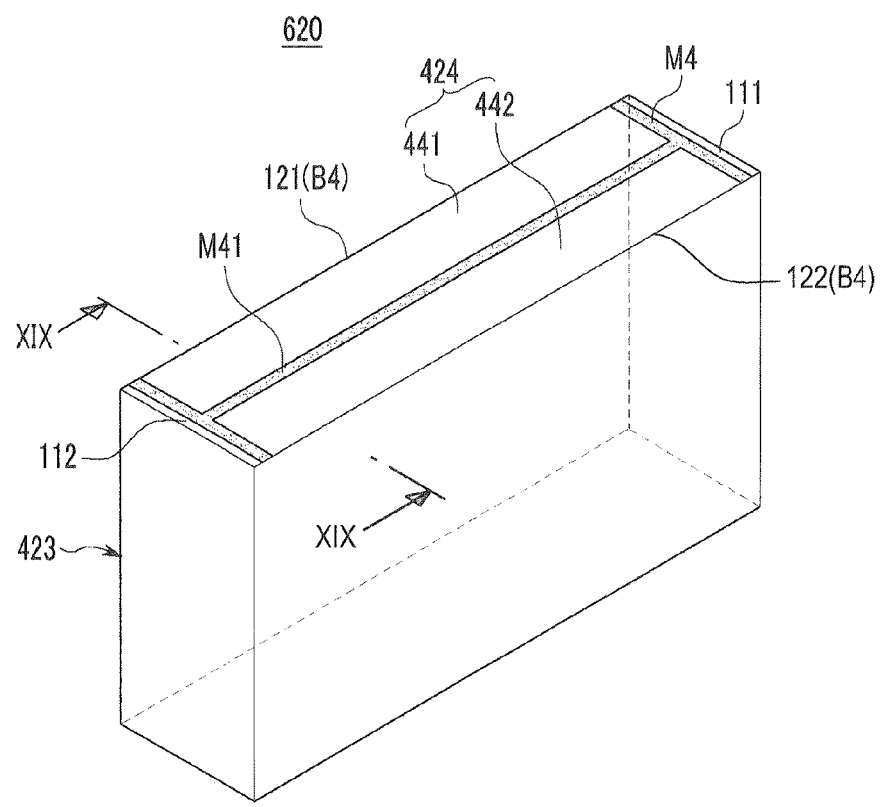
FIG. 18 is a perspective view of a can constructed as a sixth embodiment.
Figure 19:
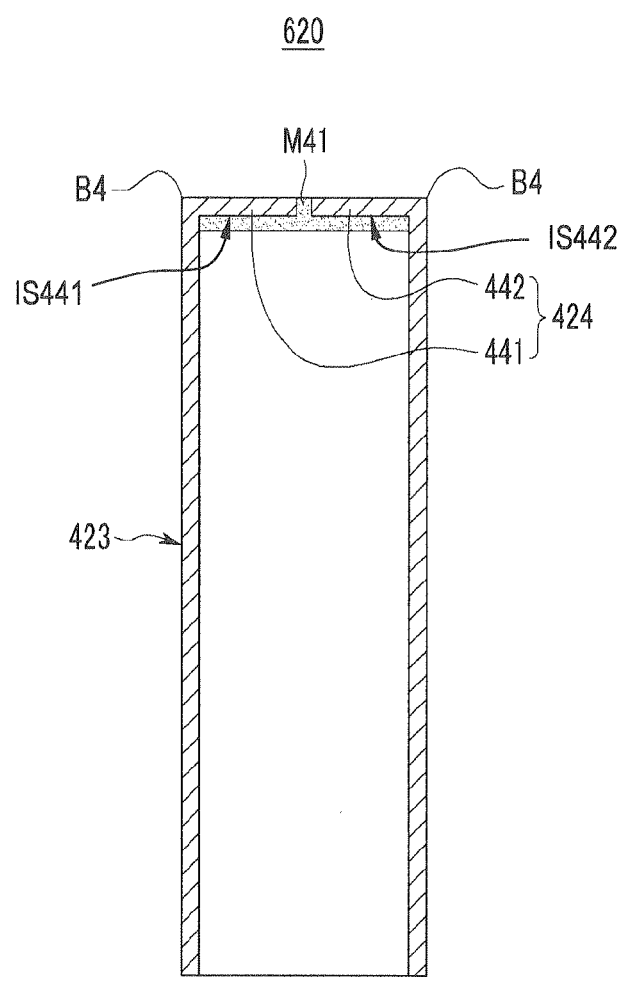
FIG. 19 is a perspective view taken along line XIX-XIX of FIG. 18.

FIG. 18 is an oblique view of a can constructed as a sixth embodiment and FIG. 19 is an oblique view taken along line XIX-XIX of FIG. 18. Referring to FIGS. 18 and 19, the can 620 of the sixth embodiment forms the body 423 and the bottom plate 424 passing through the cutting process by passing through a bending process and a molding process. The bending process bends the first and second bottom plates 441 and 442 towards an opening of the body 423, that is, bends the first and second bottom plates 441 and 442 from the first and second long sides 121 and 122 towards the opening in order to allow the first and second bottom plates 441 and 442 to face the first and second short sides 111 and 112.

The molding process connects the first and second bottom plates 441 and 442 to the first and second short sides 111 and 112 through a molded portion M4, and further connects the first and second bottom plates 441 and 442 facing each other through a molded portion M41 while connecting the first and second bottom plates 441 and 442 to the first and second long sides 121 and 122 through the bent portion B4. The molded portion M41 for connecting the first and second bottom plates 441 and 442 facing each other is positioned at the center of the first and second short sides 111 and 112 to maintain the balance of force acting on the bottom plate 424. Further, the molded portions M4 and M41 may be further formed on the inner surfaces IS441, IS442 of the first and second bottom plates 441 and 442 to further reinforce the connection between the first and second bottom plates 441 and 442. The can 620 of the sixth embodiment is applied to the body 423 and the bottom plate 424 constituting the can 420 of the fourth embodiment, but the can 620 may be applied to the bodies 23, 223, 323, and 523 and the bottom plates 24, 224, 324, and 524 of the first through the fifth embodiments.

Figure 20:
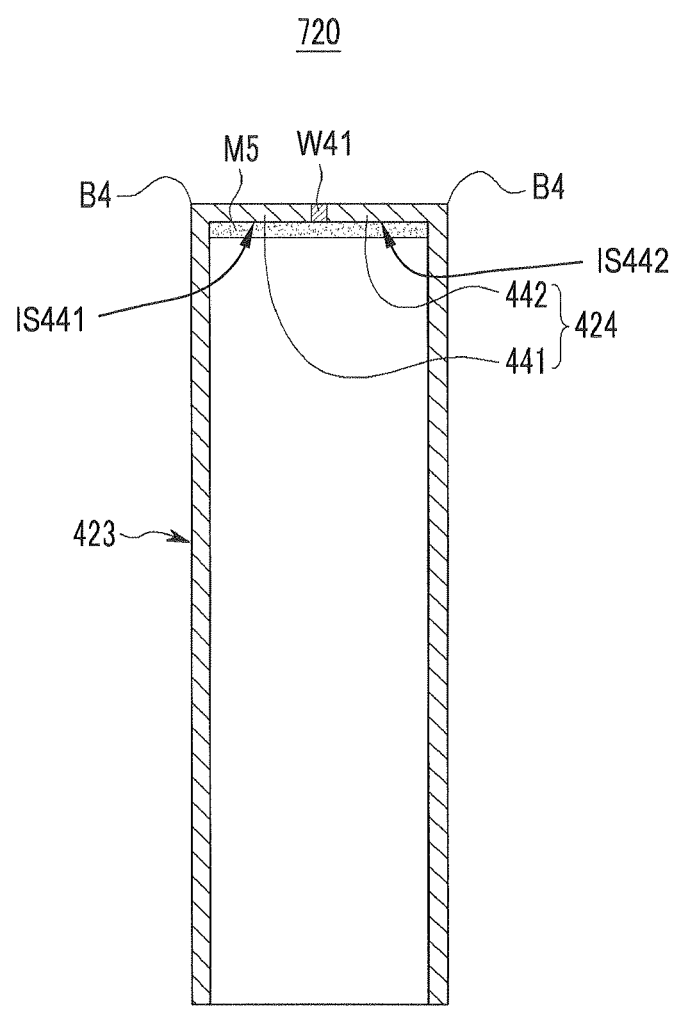
FIG. 20 is a cross-sectional view of a can constructed as a seventh embodiment.

FIG. 20 is a cross-sectional view of a can constructed as a seventh embodiment. Referring to FIGS. 13, 14, and 20, the can 720 of the seventh embodiment forms the body 423 and the bottom plate 424 passing through the cutting process by passing through a bending process, a welding process, and a molding process. The bending process bends the first and second bottom plates 441 and 442 towards an opening of the body 423, that is, bends the first and second bottom plates 441 and 442 from the first and second long sides 121 and 122 towards the opening of the body 423 in order to allow the first and second bottom plates 441 and 442 to face the first and second short sides 111 and 112.

The welding process connects the first and second bottom plates 441 and 442 to the first and second short sides 111 and 112 through the welded portion W4 and further connects the first and second bottom plates 441 and 442 facing each other through the welded portion W41 while connecting the first and second bottom plates 441 and 442 to the first and second long sides 121 and 122 through the bent portion B4.

The molding process connects the first and second bottom plates 441 and 442 to the first and second long sides 121 and 122 through the bent portion B4 and connects the first and second bottom plates 441 and 442 to the first and second short sides 111 and 112 through the welded portion W4, and while connecting the first and second bottom plates 441 and 442 facing each other to each other through the welded portion W41, covers the welded portions W4 and W41 with a molded portion M5. The molded portion M5 covers the welded portion W4 for connecting the first and second bottom plates 441 and 442 and the first and second short sides 111 and 112 and covers the welded portion W41 for connecting the first and second bottom plates 441 and 442 to each other to further prevent the electrolyte solution from being leaked. The molded portion M5 may be formed to be directly connected to at least one of the welded portions W4 and W41 and be formed on the inner surfaces IS441 and IS442. The can 720 of the seventh embodiment is applied to the body 423 and the bottom plate 424 constituting the can 420 of the fourth embodiment, but the can 720 may be applied to the bodies 23, 223, 323, and 523 and the bottom plates 24, 224, 324, and 524 of the first to third embodiment and the fifth embodiment.

The molded portions may be formed of resin or any similar known materials used for molding, and the welded portions may be formed of solder or any similar known materials used for welding.

The shape of the opening of the body may be different from a quadrangle as previously discussed as an example, and the shape of the opening of the body may be varied to meet the need during desire appearance of the battery. The shape of the bottom plate may be different from a quadrangle as previously discussed as an example, and the shape of the bottom plate may be varied to fit the shape of the opening of the body.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable battery, comprising:
an electrode assembly formed by stacking and winding a positive electrode, a separator, and a negative electrode;
a can receiving the electrode assembly, the can including a body formed by a polygonal tube which comprises a plurality of side walls and a bottom plate which is directly and integrally connected to at least one of the plurality of side walls of the body, the bottom plate bent directly from the at least one of the plurality of side walls and being physically connected to the rest of the side walls of the body by at least one of a welding portion formed of solder and a molding portion formed of resin; and a cap assembly sealing an opening of the body and the cap assembly being disposed opposite to the bottom plate.

2. The rechargeable battery of claim 1, wherein:
the plurality of side walls of the body form another opening of the body, the another opening includes,
a pair of first longer side and second longer side facing each other, and
a pair of first shorter side and second shorter side facing each other and the pair of first and second shorter sides connecting the first longer side and the second longer side to each other.

3. The rechargeable battery of claim 2, wherein:
the bottom plate
has a quadrangle shape,
to be connected to the first shorter side through a first bent portion, and
to be connected to the second shorter side and the first longer side and the second longer side through the welding portion.

4. The rechargeable battery of claim 2, wherein:
the bottom plate
has the quadrangle shape,
to be connected to the first longer side through a third bent portion, and
to be connected to the second longer side and the first shorter side and the second shorter side through the welding portion.

5. The rechargeable battery of claim 2, wherein:
the bottom plate includes,
a first bottom plate having a quadrangle shape to be connected to the first shorter side through a first bent portion, and
a second bottom plate having the quadrangle shape to be connected to the second shorter side through a second bent portion, and
the first bottom plate and the second bottom plate
face each other to be connected to each other through the welding portion, and are connected to the first longer side and the second longer side through the welding portion.

6. The rechargeable battery of claim 5, wherein:
the welding portion through which the first bottom plate and the second bottom plate face each other to be connected with each other
is positioned at centers of the first longer side and the second longer side.

7. The rechargeable battery of claim 2, wherein:
the bottom plate includes,
a first bottom plate having the quadrangle shape to be connected to the first longer side through a third bent portion, and
a second bottom plate having the quadrangle shape to be connected to the second longer side through a fourth bent portion,
the first bottom plate and the second bottom plate
face each other to be connected to each other through the welding portion, and are connected to the first shorter side and the second shorter side through the welding portion.

8. The rechargeable battery of claim 7, wherein:
the welding portion through which the first bottom plate and the second bottom plate face each other to be connected with each other
is positioned at centers of the first shorter side and the second shorter side.

9. The rechargeable battery of claim 2, wherein:
the bottom plate includes,
a first bottom plate having a trapezoid shape to be connected to the first longer side through a third bent portion,
a second bottom plate having the trapezoid shape to be connected to the second longer side through a fourth bent portion,
a third bottom plate having a triangle shape to be connected to the first shorter side through a first portion, and
a fourth bottom plate having the triangle shape to be connected to the second shorter side through a second portion,
the first bottom plate and the second bottom plate
face each other to be connected with each other through the welding portion, and
the third bottom plate and the fourth bottom plate
are connected to the first bottom plate and the second bottom plate through the welding portion.

10. The rechargeable battery of claim 2, wherein:
the bottom plate includes,
a first bottom plate having the quadrangle shape to be connected to the first longer side through a third bent portion, and
a second bottom plate having the quadrangle shape to be connected to the second longer side through a fourth bent portion,
the first bottom plate and the second bottom plate
face each other to be connected with each other through the molding portion, and are connected to the first shorter side and the second shorter side through the molding portion.

11. The rechargeable battery of claim 2, wherein:
the bottom plate includes,
a first bottom plate having the quadrangle shape to be connected to the first longer side through a third bent portion, and
a second bottom plate having the quadrangle shape to be connected to the second longer side through a fourth bent portion,
the first bottom plate and the second bottom plate,
face each other to be connected with each other through the welding portion, and are connected to the first shorter side and the second shorter side through the welding portion, and
the welding portion is covered by the molding portion.

12. The rechargeable battery of claim 1, wherein:
the bottom plate
is connected to each side of the rest of multiple surfaces through a heterogeneous material.

13. A rechargeable battery, comprising:
an electrode assembly being formed by stacking and winding a positive electrode and a negative electrode with a separator disposed between the positive and negative electrodes;
a can receiving the electrode assembly, the can made of a polygonal tube which comprises a plurality of side walls and a bottom plate which is directly and integrally connected to at least one of the plurality of side walls of the body, the body and bottom plate being integrally and simultaneously formed as a single continuous and undifferentiated monolithic body, the bottom plate bending directly from the at least one of the plurality of side walls of the body towards the rest of the side walls of the body at a bent portion, the bottom plate being physically connected to the rest of the side walls of the body by at least one of a welding portion formed of solder and a molding portion formed of resin; and a cap assembly sealing an opening of the body and the cap assembly disposed opposite to the bottom plate.

14. The rechargeable battery of claim 13, wherein the plurality of side walls form another opening of the body, the another opening includes a pair of opposite longer sides, and a pair of opposite shorter sides, and the pair of longer sides being separated by the pair of the shorter sides.

15. The rechargeable battery of claim 14, wherein the bottom plate is continuously formed with one of the pair of shorter sides, the bottom plate is bent from the one of the pair of shorter sides towards the one opening of the body.

16. The rechargeable battery of claim 14, wherein the bottom plate is continuously formed with one of the pair of longer sides, the bottom plate is bent from the one of the pair of longer sides towards the one opening of the body.

17. The rechargeable battery of claim 14, wherein the bottom plate comprises two sub bottom plates, the sub bottom plates are respectively continuously formed with two opposite sides of the opening of the body, the sub bottom plates are bent towards each other.

18. The rechargeable battery of claim 14, wherein the bottom plate comprises four sub bottom plates, the sub bottom plates are respectively continuously formed with four sides of the opening of the body, the sub bottom plates are bent towards the opening of the body.

19. A can for rechargeable battery, comprising:

a body formed by a polygonal tube; and a bottom plate bent from at least one surface of the body among multiple surfaces of the body towards an opening of the body, the bottom plate being physically connected to the rest of the multiple surfaces of the body.

20. The can of claim 19, wherein:

the opening of the body includes, a pair of first longer side and second longer side facing each other, and a pair of first shorter side and second shorter side facing each other and the pair of first and second shorter sides connecting the first longer side and the second longer side to each other.

* * * * *